Oct. 15, 1929.  E. L. MYERS  1,731,499
AUTOMOBILE BRAKING MECHANISM
Filed June 27, 1927   2 Sheets-Sheet 2

Inventor
Eldridge L. Myers
By
Attorney

Patented Oct. 15, 1929

1,731,499

UNITED STATES PATENT OFFICE

ELDRIDGE L. MYERS, OF WASHINGTON, DISTRICT OF COLUMBIA

AUTOMOBILE BRAKING MECHANISM

Application filed June 27, 1927. Serial No. 201,871.

My invention relates to improvements in automobile braking mechanism and refers particularly to a four wheel braking structure, although not limited to such use as the mechanism would operate either upon the front or rear wheels in an efficient and practical manner and thus would prove satisfactory in either situation.

One object of my invention is the provision of a mechanism which will be of the simplest, cheapest and most durable construction to withstand the hard usage to which such a mechanism is subjected and which mechanism may be applied to vehicles in use or at the time of manufacture.

Another object of my invention is the provision of a brake mechanism the parts of which are readily accessible from the exterior for any desired purpose, and in which the parts subjected to the greatest wear and strain can be quickly and cheaply replaced or repaired.

Another object of my invention is the provision of a mechanism of this character which will not become excessively heated by hard and constant service, and thus will insure efficiency and long life to the mechanism.

Another object of my invention is the provision of a braking mechanism of the character and for the purposes stated which can be operated with ease and facility, which will prove efficient and reliable under all conditions and generally in every particular will prove thoroughly practical.

With these objects in view, my invention consists of an automobile braking mechanism embodying novel features of construction and combination of parts substantially as described and claimed and as shown in the accompanying drawings, in which:

Figure 1:
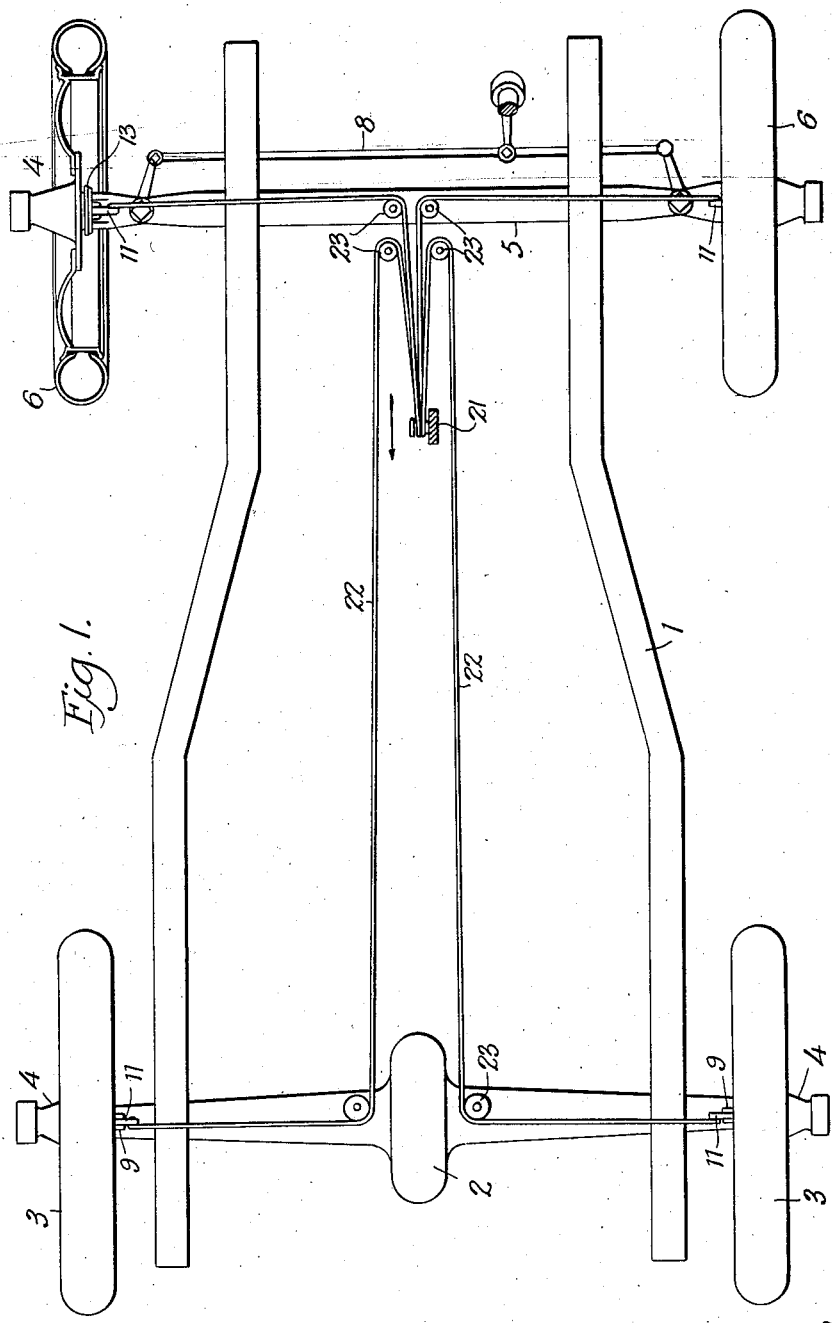
Figure 1 represents a plan view of the chassis, front and rear axles and wheels with my braking mechanism applied to show clearly the complete structure.

In the drawings the mechanism for illustration is shown in connection with and for the purpose of applying the brake to four wheels, although the operation would be identical whether the brake mechanism were adapted to either the front or rear wheels of the vehicle, and in said drawings, the numeral 1 designates the frame or chassis, 2 designates the rear gear casing, 3 the rear wheels, 4 the hub caps on the rear axle, 5 the front axle, 6 the front wheels, 7 the pivoted axle boxes mounted upon said front axle, and 8 the connecting means between said axle boxes for turning or shifting said boxes in the guiding of the wheels 6.

Figure 2:
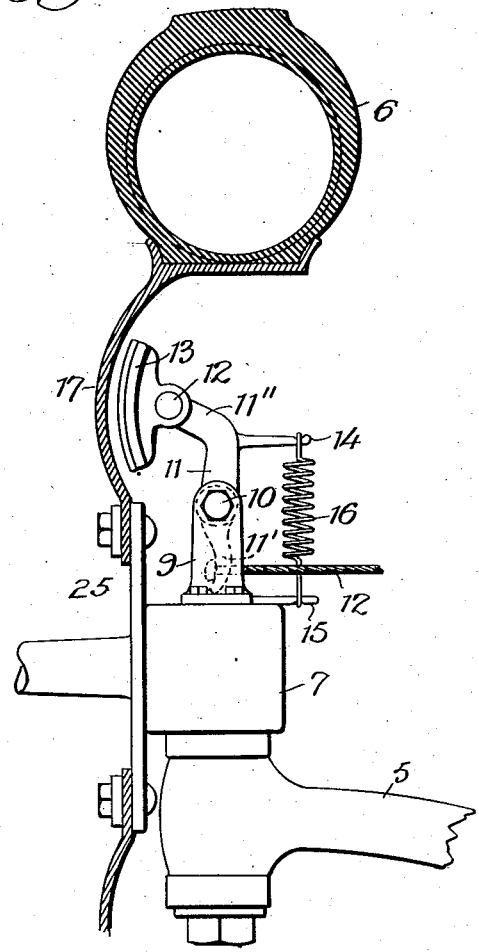
Fig. 2 represents a view partly in elevation and partly in section on enlarged scale of one member of my braking mechanism.

The mechanism comprising the operating parts of my brake is extremely simple and consists of four brackets or supports 9, which are secured rigidly to the front and rear axles of the machine in proper relation to the wheels of the vehicle, and in said brackets or supports are fulcrumed or pivoted at 10, the four levers 11, the construction shown in Fig. 2 which is used in connection with a cable or flexible connection 12, being secured to a depending arm 11', while the upper arm 11", has pivoted thereto at 12, the brake shoe 13, and has further formed upon said upper arm 11" the extension 14. A coil spring 16 is connected to the extensions 14 and 15 and normally retains the pivoted brake shoe in the position shown in Figures 2 and 3, or out of contact with the disc 17 of the wheel.

Figure 3:
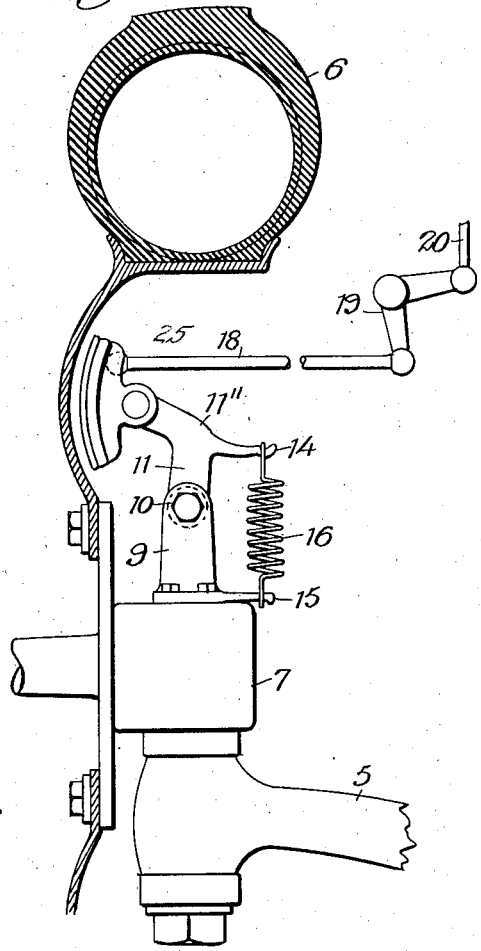
Fig. 3 represents a similar view of a modified construction of braking mechanism.
Figure 4:
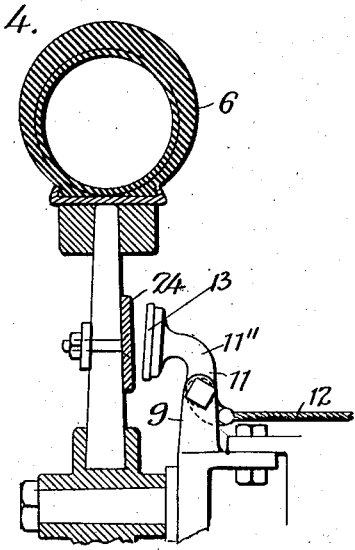
Fig. 4 represents a similar view of a further modified form of my invention in which the mechanism is adapted to wheels using spokes instead of metal disks as shown in Figs. 2 and 3.

The construction shown in Fig. 2 is particularly constructed and adapted for use where a cable is employed, and in the construction shown in Fig. 3, the connection is made with the brake shoes through a rod 18, bell crank lever 19, and rod 20, but in both instances the action of the shifting lever 21, through the medium of the connections 22, which are guided by suitable pulleys 23, the action is identical, the springs normally holding the brake shoes out of contact and returning them under all conditions to normal position, while the movement rearward of the shifting lever as indicated by the arrow moves the brake shoes into contact directly with the disc of the wheel, or with the band 24, and effects a positive and reliable braking action.

From the foregoing description taken in connection with the drawings, the operation and advantages of my invention will be readily understood, and it will be at once apparent that the mechanism comprising my brake is simple, durable, inexpensive and will prove absolutely efficient and reliable under all conditions.

It will be noted that I provide a ball and socket or accommodating connection 25 between the brake shoe operating connection which permits the proper movement of the cable or connection with the turning of the front wheels of the vehicle, which is of great importance.

I claim:

1. In a braking mechanism of the character described, the combination with the front and rear disk wheels of a vehicle, of braking means including a plurality of levers, a friction member carried by each lever having a transverse movement to engage the inner portion of the wheel body to effect the braking action, means for holding the levers with the friction member out of contact with the wheel body, connections between the front and rear levers, and manually operated means for simultaneously applying the friction members to said front and rear wheels.

2. In a braking mechanism of the character described, the combination with the front and rear disk wheels of a vehicle, of braking means including a plurality of levers, each having a transverse movement, a friction member on the free end of each lever to engage the inner portion of the wheel to effect the braking action, connections between the front and rear levers, means for retaining the braking levers with the friction members normally out of contact with the wheels, and manually operated means for simultaneously applying the braking mechanism to said front and rear wheels.

3. The combination with an automobile chassis having front and rear axles and disk wheels, of a braking mechanism including a plurality of levers one to each wheel, fulcrumed upon the axle adjacent the wheel for swinging movement transversely of the chassis, the free upper end of each lever being in a line between the hub and the rim of the wheel, a friction member carried in such free end, a spring engaging the other end of the lever to hold the friction member out of contact with the body of the wheel, and means operably connected to all levers whereby all levers are manually operated simultaneously to force the friction members into engagement with the body of the disk wheels to contact the same at single point between the hub and rim.

4. In a braking mechanism, the combination with a disk wheel capable of revolution, a segmental portion thereof constituting a brake receiving element, and a manually operated and controlled element adapted to frictionally engage said brake receiving element.

5. In a braking mechanism of the character described, the combination of a rotatable member, a wheel on said member a segment of which forms a friction element, a shoe for engaging said friction element, a lever carrying said shoe and normally holding the shoe out of contact with said friction element, and means for moving said lever to force said shoe against said friction element to effect the braking action.

6. In a braking mechanism of the character described, the combination with the wheels of a vehicle, a friction element carried by said wheels, a series of pivoted levers, shoes at one end of said levers and normally held free of the friction elements carried by said wheels, and means connected with the other ends of said pivoted levers for moving said levers to cause the shoes at their other ends to bear against said friction elements on said wheels to effect a braking action.

7. In a braking mechanism of the character described, the combination of an axle, a hub mounted for rotation on said axle, a disk having one edge connected with said hub and having its other edge formed with a tire receiving rim, a tire mounted in said rim, a pivoted lever, a shoe at one end of said lever and disposed to frictionally bear against said disk, a spring to hold the shoe out of engagement with said disk, and means connected to the other end of said lever for moving said lever to force the shoe against said disk and effect a braking action.

In testimony whereof I hereunto affix my signature.

ELDRIDGE L. MYERS.